United States Patent
Cole et al.

(10) Patent No.: US 9,985,301 B2
(45) Date of Patent: May 29, 2018

(54) FUEL CELL ASSEMBLY

(71) Applicant: INTELLIGENT ENERGY LIMITED, Leicestershire (GB)

(72) Inventors: Jonathan Cole, Loughborough (GB); Christopher James Kirk, Loughborough (GB); Christopher Conlon, Loughborough (GB); Peter David Hood, Loughborough (GB)

(73) Assignee: Intelligent Energy Limited, Leicestershire (GB)

( * ) Notice: Subject to any disclaimer, the term of this patent is extended or adjusted under 35 U.S.C. 154(b) by 614 days.

(21) Appl. No.: 14/345,918

(22) PCT Filed: Sep. 20, 2012

(86) PCT No.: PCT/GB2012/052324
§ 371 (c)(1),
(2) Date: Mar. 19, 2014

(87) PCT Pub. No.: WO2013/041867
PCT Pub. Date: Mar. 28, 2013

(65) Prior Publication Data
US 2014/0220473 A1 Aug. 7, 2014

(30) Foreign Application Priority Data
Sep. 21, 2011 (GB) .................................. 1116275.7

(51) Int. Cl.
*H01M 8/02* (2016.01)
*H01M 8/0273* (2016.01)
(Continued)

(52) U.S. Cl.
CPC ......... *H01M 8/0273* (2013.01); *H01M 8/021* (2013.01); *H01M 8/026* (2013.01);
(Continued)

(58) Field of Classification Search
CPC ............ H01M 8/0254; H01M 8/0271; H01M 8/0276; H01M 8/0228; H01M 8/021;
(Continued)

(56) References Cited

U.S. PATENT DOCUMENTS 4,514,475 A * 4/1985 Mientek .............. H01M 8/0206
429/460
5,270,129 A 12/1993 Ishida
(Continued)

FOREIGN PATENT DOCUMENTS

GB 2437767 11/2007
JP 10265463 5/1985
(Continued)

OTHER PUBLICATIONS

Machine English translation of JP H07-302602 to Yoshikawa et al.*
(Continued)

*Primary Examiner* — Michael L Dignan
(74) *Attorney, Agent, or Firm* — Baker & Hostetler LLP

(57) ABSTRACT

The invention relates to fuel cell assemblies, and in particular to improvements relating to sealing of such assemblies, embodiments of which include a fuel cell assembly (200) comprising a membrane electrode assembly (104), a cathode separator plate (208) having a series of corrugations extending, and providing air flow paths, between first and second opposing edges of the plate, a gasket (105) providing a fluid seal around a peripheral edge of the membrane electrode assembly (104) between the separator plate (208) and the membrane electrode assembly (104) and a metal shim (107) disposed between the gasket (105) and the separator plate (208) over the peripheral edge of the membrane electrode assembly (104).

4 Claims, 6 Drawing Sheets

(51) Int. Cl.
  *H01M 8/026* (2016.01)
  *H01M 8/0254* (2016.01)
  *H01M 8/0271* (2016.01)
  *H01M 8/0276* (2016.01)
  *H01M 8/021* (2016.01)
  *H01M 8/0228* (2016.01)
  *H01M 8/1018* (2016.01)

(52) U.S. Cl.
  CPC ....... *H01M 8/0228* (2013.01); *H01M 8/0254* (2013.01); *H01M 8/0271* (2013.01); *H01M 8/0276* (2013.01); *H01M 2008/1095* (2013.01); *H01M 2300/0065* (2013.01)

(58) Field of Classification Search
  CPC . H01M 2300/0065; H01M 2008/1095; H01M 8/0273; H01M 8/026; Y02E 60/50
  See application file for complete search history.

(56) References Cited

U.S. PATENT DOCUMENTS

| | | | |
|---|---|---|---|
| 6,533,827 B1 | 3/2003 | Cisar | |
| 2001/0049044 A1* | 12/2001 | Molter | C25B 9/04 429/434 |
| 2002/0022170 A1 | 2/2002 | Franklin et al. | |
| 2003/0235746 A1 | 12/2003 | Haltiner | |
| 2004/0121200 A1 | 6/2004 | Johnsen et al. | |
| 2004/0151975 A1* | 8/2004 | Allen | B21D 13/02 29/623.1 |
| 2004/0170882 A1* | 9/2004 | Ohara | H01M 8/0206 429/444 |
| 2004/0170883 A1 | 9/2004 | Bartholomeyzik | |
| 2007/0190395 A1* | 8/2007 | Ryu | H01M 8/0206 429/478 |
| 2007/0238005 A1* | 10/2007 | Yagi | B32B 15/08 429/509 |
| 2008/0107944 A1* | 5/2008 | Goebel | H01M 8/0271 429/434 |
| 2008/0193824 A1 | 8/2008 | Frasce et al. | |
| 2009/0042086 A1 | 2/2009 | Ishikawa et al. | |
| 2009/0325037 A1* | 12/2009 | Hood | H01M 8/0254 429/457 |
| 2011/0033782 A1 | 2/2011 | Chin et al. | |
| 2011/0129756 A1* | 6/2011 | Erikstrup | H01M 8/0254 429/457 |
| 2012/0015283 A1* | 1/2012 | Cha | H01M 8/0284 429/516 |

FOREIGN PATENT DOCUMENTS

| | | |
|---|---|---|
| JP | 62110264 | 5/1987 |
| JP | 63053857 | 3/1988 |
| JP | 63232268 | 9/1988 |
| JP | 63279578 | 11/1988 |
| JP | 64048376 | 2/1989 |
| JP | 07105962 | 4/1995 |
| JP | 07302602 | 11/1995 |
| JP | 30225766 | 11/2001 |
| JP | 2006054198 | 2/2006 |
| JP | 2007005210 | 1/2007 |
| JP | 2007035455 | 2/2007 |

OTHER PUBLICATIONS

Machin English translation of JP 2007-005210 to Tajima et al.*
United Kingdom Search Report dated Nov. 25, 2011, issued in GB Patent Application 1116275.7.
United Kingdom Search Report dated Mar. 14, 2012, issued in GB patent application 1116275.7.
United Kingdom Search Report dated Feb. 23, 2011, issued in GB patent application 1021274.4.
International Search Report dated Jun. 24, 2013, issued in International patent application PCT/GB2012/052324.

* cited by examiner ic # FUEL CELL ASSEMBLY

REFERENCE TO RELATED APPLICATIONS

This application is a National Stage of International Application No. PCT/GB2012/052324, filed on Sep. 20, 2012, which claims priority to GB Application No. 1116275.7, filed on Sep. 21, 2011, the disclosures of which are incorporated by reference in their entirety.

The invention relates to fuel cell assemblies, and in particular to improvements relating to sealing of such assemblies.

In open cathode fuel cell stacks, air flow is directed across the cathode side of each fuel cell, so that oxidant is available to the cathode side of the membrane-electrode assembly (MEA) of the fuel cell, typically via a diffusion layer. To achieve a uniform flow of air across an entire stack, a common arrangement is to flow air in parallel across the cell stack between opposing faces of the stack, so that air flows across each cell from one edge to an opposing edge.

A typical way of achieving a sufficient degree of air flow across each cell of a stack, while keeping the overall weight of the stack down, is through using corrugated cathode separator plates. Such separator plates act both to form an electrical connection with the cathode side of the fuel cell electrolyte and to provide pathways for air flow across an underlying diffuser layer.

A problem with using conventional corrugated cathode separator plates is that, at the open edges of each cell, there is only an intermittent connection with the underlying electrolyte layer and any intervening gasket material. This can result in separation of the underlying layers, for example during thermal cycling of the stack, which may eventually cause leakage. Gaps between contacts with the underlying layers of the cell could be made smaller by for example making the corrugation pitch smaller, but this would have the effect of reducing the volume of air flow paths available across the cell. Another possible way of reducing the possibility of leakage would be to increase the width of a gasketed region surrounding an active region of the fuel cell. This would, however, reduce the proportion of the active area of the cell, and thereby reduce the efficiency of the cell. This is a particular problem for smaller form fuel cell stacks, where the edge gasket region will generally form a higher proportion of the overall cell area.

It is an object of the invention to address one or more of the above mentioned problems.

In accordance with a first aspect of the invention there is provided a fuel cell assembly comprising:
a membrane electrode assembly;
a cathode separator plate having a series of corrugations extending, and providing air flow paths, between first and second opposing edges of the plate;
a gasket providing a fluid seal around a peripheral edge of the membrane electrode assembly between the separator plate and the membrane electrode assembly; and
a metal shim disposed between the gasket and the separator plate over the peripheral edge of the membrane electrode assembly,
wherein the metal shim is provided as an integral part of the separator plate, the metal shim comprising first and second strips longitudinally extending transverse the corrugations of the separator plate and extending along respective first and second opposing edges of the plate.

An advantage of the invention is that the metal shim provides a more uniform sealing pressure between the separator plate and the underlying sealing region of the gasket. This is due to the material from which the shim is formed having a substantially higher stiffness than the gasket or MEA material, thereby allowing the intermittent pressure profile provided by the corrugated separator plate to be more uniformly applied. The metal shim bridges crests of the corrugations along the face of the separator plate facing the MEA, thereby transferring a part of the pressure applied over the crests to a region between the crests. This reduces the possibility of leakage around the underlying membrane electrode assembly without adversely affecting air flow along the corrugations of the separator plate. An advantage of the metal shim being provided in the form above, i.e. integral to the separator plate, is that the plate and shim can be made as a common part, which reduces the number of components used in an assembly process for the fuel cell and can also reduce wastage of material when forming the shim and plate assembly as an integral component from a single sheet of feedstock material.

The metal shim may be composed of the same material as the separator plate. A particular preferred material for the shim is stainless steel, i.e. a chromium-alloyed steel suitable for use in wet oxidising environments such as those found within fuel cells. The shim preferably has a thickness of between 50 and 150 micrometers. In certain preferred embodiments the shim has a nominal thickness of around 100 micrometers.

In accordance with a second aspect of the invention there is provided a fuel cell assembly comprising:
a membrane electrode assembly;
a cathode separator plate having a series of corrugations extending, and providing air flow paths, between first and second opposing edges of the plate;
a gasket providing a fluid seal around a peripheral edge of the membrane electrode assembly between the separator plate and the membrane electrode assembly; and
a metal shim disposed between the gasket and the separator plate over a peripheral edge of the membrane electrode assembly,
wherein the metal shim comprises one or more engagement features configured to engage with corresponding edges of the separator plate for retaining a lateral position of the plate relative to the shim.

An advantage of the shim comprising one or more engagement features is a reduction in the possibility of movement of the components relative to each other during assembly.

The shim may be provided as a separate component to the separator plate, where the shim is provided in the form of a frame positioned to surround a diffusion layer portion of the membrane electrode assembly.

In accordance with a third aspect of the invention there is provided a method of forming a fuel cell assembly comprising the steps of:
providing a membrane electrode assembly;
providing a cathode separator plate having a series of corrugations extending, and providing air flow paths, between first and second opposing edges of the plate;
interposing a gasket between the separator plate and the membrane electrode assembly, the gasket surrounding a diffusion layer of the membrane electrode assembly;
providing a metal shim interposed between the gasket and the separator plate over a peripheral edge of the membrane electrode assembly;
wherein the metal shim is provided as an integral part of the separator plate, the metal shim comprising first and second strips longitudinally extending transverse the corrugations of the separator plate and extending along respective first and second opposing edges of the plate; and applying mechanical compression across the thickness of the membrane electrode assembly, cathode separator plate, gasket and shim to provide a fluid seal around the peripheral edge of the membrane electrode assembly.

In accordance with a fourth aspect of the invention there is provided a method of forming a fuel cell assembly comprising the steps of:

providing a membrane electrode assembly;

providing a cathode separator plate having a series of corrugations extending, and providing air flow paths, between first and second opposing edges of the plate;

interposing a gasket between the separator plate and the membrane electrode assembly, the gasket surrounding a diffusion layer of the membrane electrode assembly;

providing a metal shim interposed between the gasket and the separator plate over a peripheral edge of the membrane electrode assembly, the metal shim comprising one or more engagement features configured to engage with corresponding edges of the separator plate to retain a lateral position of the plate relative to the shim; and applying mechanical compression through the thickness of the membrane electrode assembly, cathode separator plate, gasket and shim to provide a fluid seal around the peripheral edge of the membrane electrode assembly.

In accordance with a fifth aspect of the invention there is provided a fuel cell separator plate having first and second opposing faces and first and second opposing edges, the separator plate having a series of corrugations extending, and providing air flow paths, between the first and second opposing edges, the separator plate comprising first and second strips longitudinally extending transverse the series of corrugations and extending respectively along the first and second opposing edges of the plate.

A separator plate according to the fifth aspect of the invention has an advantage of providing the cathode air flow paths and a shim component for providing improved support across the fuel cell in one component, thereby reducing the number of assembly steps.

In accordance with a sixth aspect of the invention there is provided a method of forming a fuel cell separator plate comprising the steps of:

providing a metal plate having first and second opposing edges and third and fourth opposing edges;

cutting the plate to form first and second strips longitudinally extending along the first and second opposing edges;

applying a series of corrugations to the metal plate to form a corrugated region providing air flow paths between the first and second opposing edges of the plate; and folding the first and second strips to cover edge portions of the corrugated region on the second face along the respective first and second opposing edges.

An advantage of the above method of forming the fuel cell separator plate is that the load spreading feature that would otherwise be provided by a separate shim can be provided as a unitary part of the corrugated plate, formed during the manufacturing process of the plate.

The first and second strips preferably remain attached to the plate towards the third edge of the plate. The step of cutting the plate preferably involves cutting the plate from the fourth edge of the plate towards the third edge along first and second cut lines that are substantially parallel with the first and second edges of the plate. The first and second cut lines preferably do not extend all the way to the third edge of the plate. The step of folding the first and second strips may involve forming first and second fold lines extending between the first and second cut lines and the third edge of the plate, the first and second fold lines being substantially parallel with the first and second edges of the plate.

The first and second strips may be attached to the plate towards the fourth edge of the plate, for example by means of spot welding or by other means of forming a bond between opposing portions of the second face of the plate after the step of folding the first and second strips.

Aspects and embodiments of the invention are described in further detail below by way of example and with reference to the enclosed drawings in which.

Figure 1:
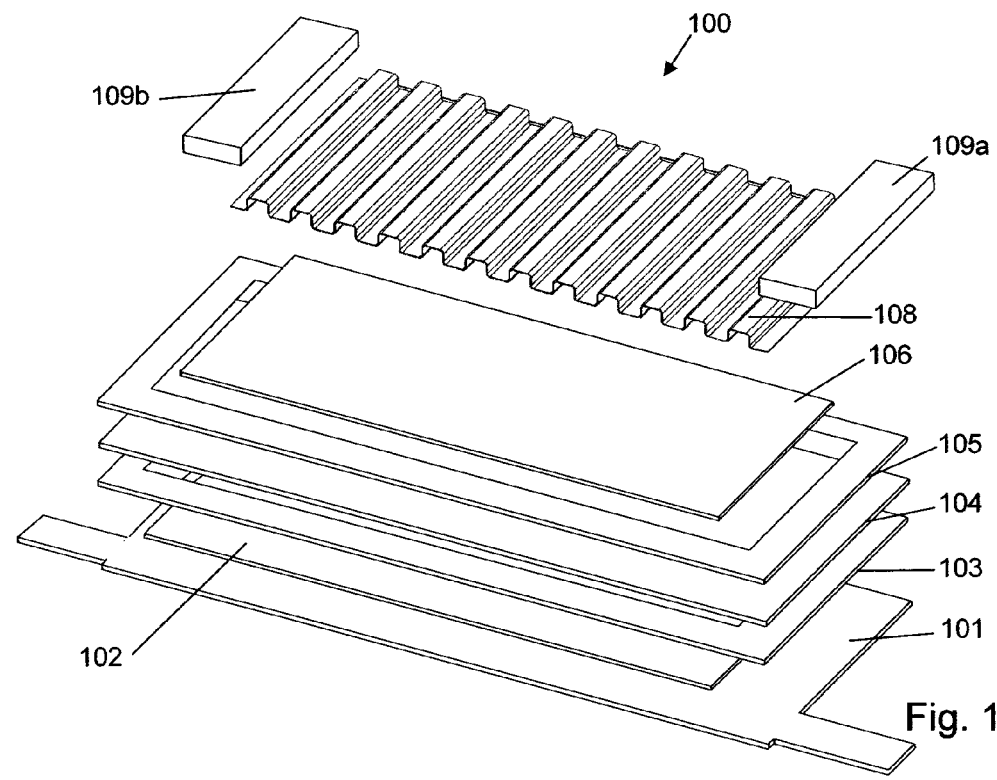
FIG. 1 is an exploded perspective view of an exemplary fuel cell assembly.

Illustrated in FIG. 1 is an exploded perspective view of an exemplary fuel cell assembly 100. The fuel cell assembly 100 comprises, in sequential order, an anode plate 101, an anode side diffuser layer 102, an anode gasket 103, a membrane electrode assembly (MEA) 104, a cathode gasket 105, a cathode side diffuser layer 106, a corrugated cathode separator plate 108 and a pair of manifold gaskets 109a, 109b for supplying fuel to the anode side of the cell.

Figure 2:
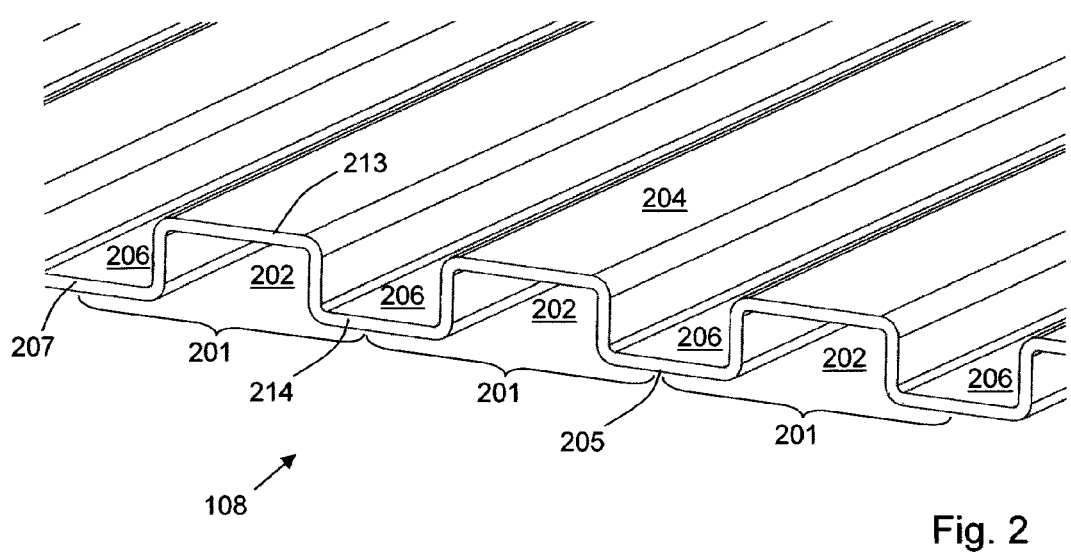
FIG. 2 is a detail perspective view of an edge portion of a corrugated cathode separator plate.

FIG. 2 illustrates the general form of an exemplary corrugated cathode separator plate 108 for use in the fuel cell assembly 100 of FIG. 1, the plate 108 having first and second opposing faces 204, 205. The plate 108 has a series of corrugations 201 extending, and providing air flow paths 202, between first and second opposing edges of the plate, the first edge 207 of which is shown in FIG. 2. Each corrugation 201 in the plate 108 comprises a crest 213 on the first face 204 of the plate 108 and a crest 214 on the opposing second face 205 of the plate 108. A second opposing edge of the plate 108 will generally have the same or similar form. Air flow paths 202 defined between crests 213 on the first face 204 and the second face 205 provide passages for air to pass along the plate between the plate and the underlying diffuser layer 106 of the cell assembly for providing oxidant to the cathode side of the MEA 104. Other air flow paths 206 defined between crests 214 on the second face and the first face 204 allow air to pass along the plate 108 between the plate 108 and an adjacent cell to provide cooling.

The corrugated cathode separator plate 108 provides only intermittent support over the gasket 105 and the underlying MEA 104. In regions where the plate 108 does not contact the underlying gasket 105, i.e. regions where air flow paths 202 are provided through the plate 108, the gasket 105 is not under as much compressive pressure as where the plate 108 provides direct contact along the crests of the corrugations on the second face of the plate. A result of this reduced pressure is that the underlying gaskets 103, 105 may partly separate from adjacent layers. In some circumstances this can result in leaks.

Figure 3:
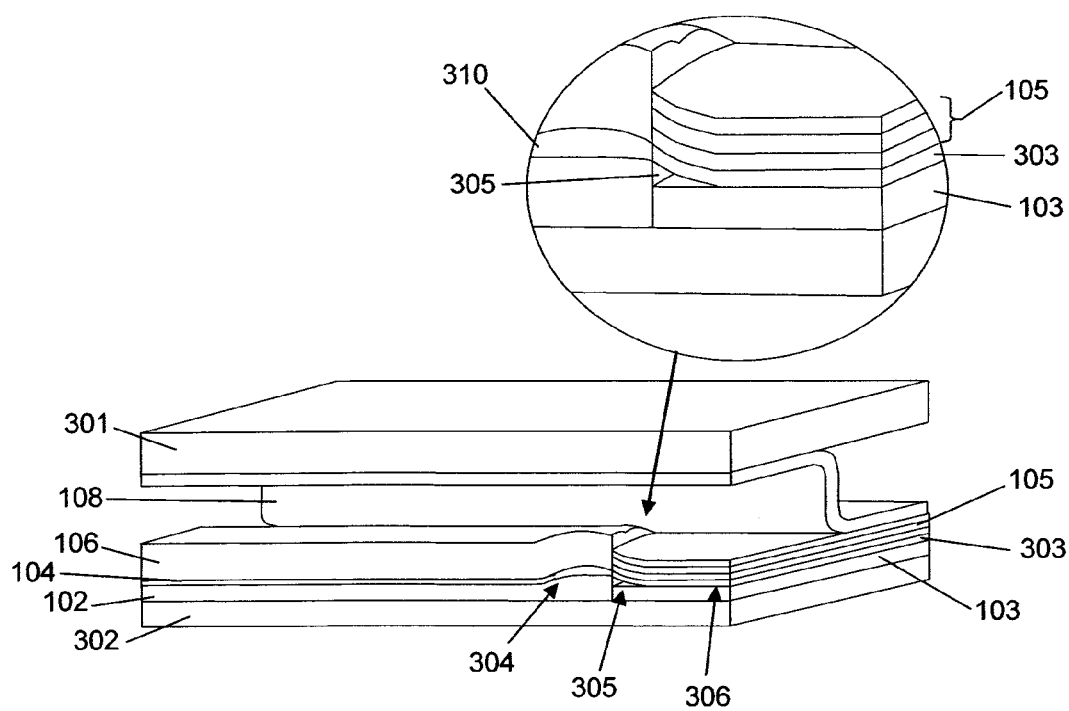
FIG. 3 is a detail sectional perspective view of an edge portion of the fuel cell of FIG. 1 after assembly.

An illustration of the effect of intermittent support from the corrugated separator plate 108 is shown in FIG. 3, which represents schematically an output result from finite element analysis of a single fuel cell assembly assembled and held between opposing faces of two rigid plates 301, 302. The expanded view of the edge region 310 of the fuel cell assembly shows that a gap 305 is formed between a sub-gasket region 303 of the MEA 104 and the anode side gasket 103 due to the flexibility of the gasket 105. The sub-gasket region 303 also causes deformation of the cathode side diffuser layer 106, which is not resisted by the cathode separator plate 108. In this case, the resulting gap 305 extends almost to the edge 306 of the fuel cell assembly, resulting in a risk of leakage of fuel gas (i.e. hydrogen) from the anode side of the cell.

Figure 4:
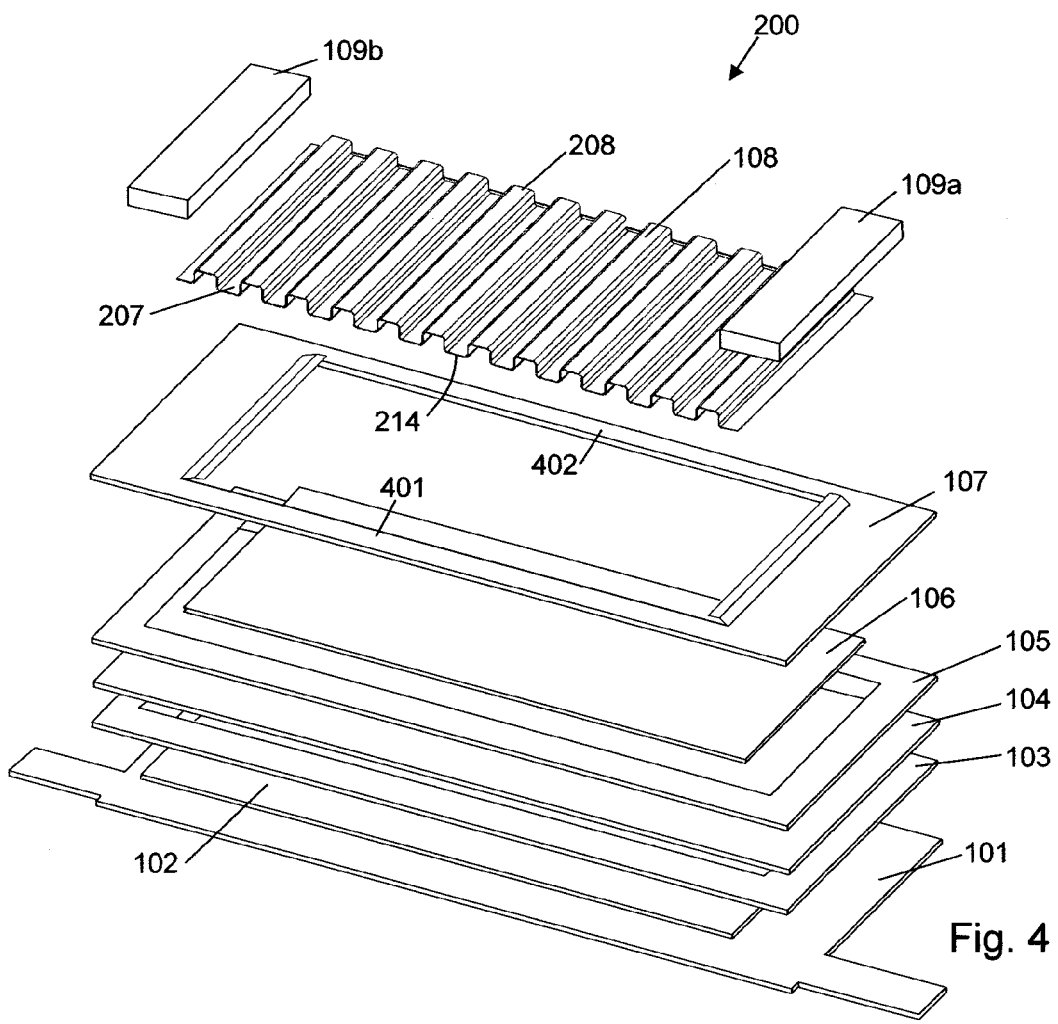
FIG. 4 is an exploded perspective view of an exemplary fuel cell assembly according to an embodiment of the invention.

FIG. 4 illustrates a fuel cell assembly 200 according to an embodiment of the invention. The components of the assembly 200 are identical to those illustrated in FIG. 1 and described above, except for the addition of a separate metal shim 107. The metal shim 107 is interposed between the cathode side gasket 105 and the cathode separator plate 108 over a peripheral edge of the MEA 104, i.e. coincident with an outer portion of the MEA sub-gasket 303 illustrated in FIG. 3.

The metal shim 107 is in the form of a frame having first and second longitudinally extending strips 401, 402 that extend across the series of corrugations in the separator plate 108. The first and second strips 401, 402 extend along the respective first and second edges 207, 208 of the plate 108 so that, when the fuel cell is assembled, the strips 401, 402 bridge the crests 214 of the corrugations across the second face of the plate 108.

Figure 5:
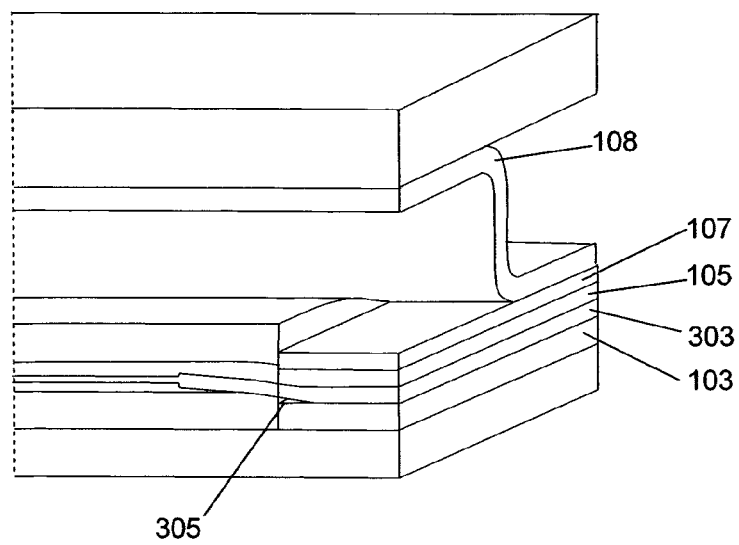
FIG. 5 is a detail sectional perspective view of an edge portion of the fuel cell of FIG. 4 after assembly.

FIG. 5 illustrates schematically an output result from finite element analysis of a single fuel cell assembly similar to that shown in FIG. 3 but in this case including the metal shim 107 between the anode gasket 105 and the cathode separator plate 108. Unlike in the fuel cell of FIG. 3, using the metal shim 107 results in the gap 305 between the MEA sub-gasket 303 and the anode gasket 103 being substantially reduced, thereby reducing the likelihood of any anode gas leakage from the cell. This is a result of the increased tensile stiffness of the metal shim material compared with the cathode gasket material, which is typically made of a polymeric material such as a polyester. As an illustrative example, stainless steel may have a tensile stiffness (Young's modulus) of around 200 GPa, whereas a polyester film may have a tensile stiffness of around 3 GPa. This increase in material stiffness, approaching two orders of magnitude, allows the shim 107 to effectively resist any outward movement of the underlying gasket material 103 in regions where there is no direct contact with the separator plate 108.

In some embodiments, the cathode gasket 105 shown in FIG. 5 may be omitted, and the gasket between the shim 107 and the MEA provided purely by the sub-gasket region 303 of the MEA. Alternatively, a gasket material may be provided on a face of the shim 107 facing the MEA. A fluid seal is not required on the cathode side of the fuel cell, since the corrugated separator plate is used as part of an open cathode fuel cell assembly. The important fluid seal formed on applying mechanical compression through the thickness is instead that on the anode side, which prevents anode gas from leaking out of the cell.

Figure 6:
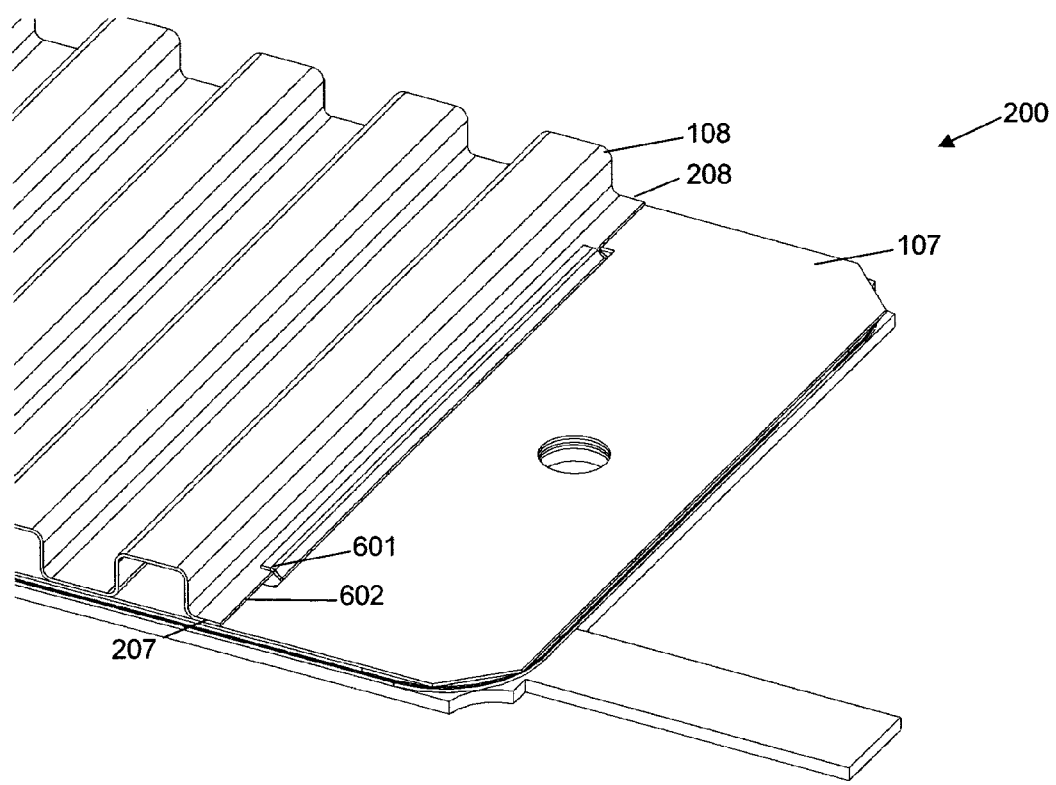
FIG. 6 is a detail perspective view of a portion of the fuel cell assembly of FIG. 4 after assembly.

FIG. 6 shows a perspective view of a portion of an assembled fuel cell 200 in accordance with an embodiment of the invention. An engagement feature 601 is provided on the metal shim 107 for engagement with an edge 602 of the corrugated plate 108. The engagement feature 601 holds the edge 602 of the plate 108 against the shim 107 and prevents lateral movement of the plate 108 relative to the shim 107 in a direction parallel to the first and second edges 207, 208. A corresponding engagement feature (not shown in FIG. 6) may also be provided on an opposing side of the shim 107 for engaging with an opposing edge of the plate 108. In the embodiment shown, the engagement feature 601 comprises a portion of the shim that is bent out of the plane of the shim 107 so that the first and second opposing faces of the plate 108 are held by the engagement feature 601 along the edge 602. The engagement feature 601 may comprise multiple such bent portions extending along an internal perimeter of the shim, the bent portions engaging with first or second opposing surfaces along the edge 602 of the plate 108.

In other embodiments, the plate 108 and the metal shim may be bonded to each other, for example by means of spot welding or adhesive bonding. An advantage of the parts being bonded is that the shim and plate can be handled as a single component during assembly of the fuel cell stack, thereby reducing the number of process steps.

Figure 7:
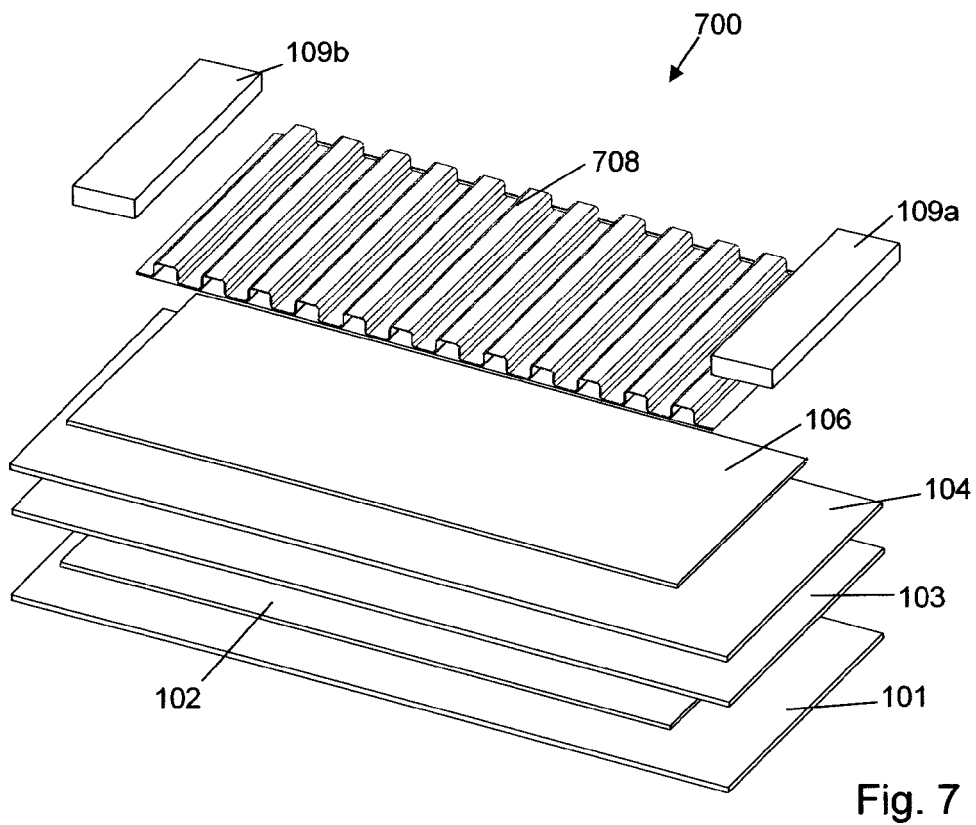
FIG. 7 is an exploded perspective view of an exemplary fuel cell assembly according to an alternative embodiment of the invention.

FIG. 7 illustrates a fuel cell assembly 700 in accordance with an embodiment of, the invention, having a different form of separator plate 708 to that described above. In this embodiment, the metal shim is provided as an integral part of the separator plate, and comprises first and second strips longitudinally extending transverse the corrugations of the separator plate and extending along respective first and second opposing edges of the plate. Other components of the fuel cell are as described above in relation to other embodiments, and are provided with common reference signs in FIG. 7 to indicate this.

In the embodiment of FIG. 7, only an anode side gasket 103 is provided in the assembly 700. A cathode side gasket is provided by the combination of the separator plate 708 and a sub-gasket region of the MEA 104.

Figure 8:
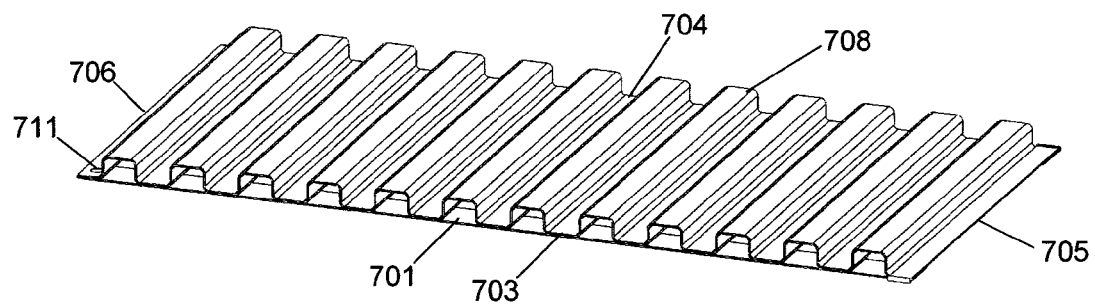
FIG. 8 is a perspective view of the corrugated separator plate of the fuel cell assembly of FIG. 7.
Figure 9:
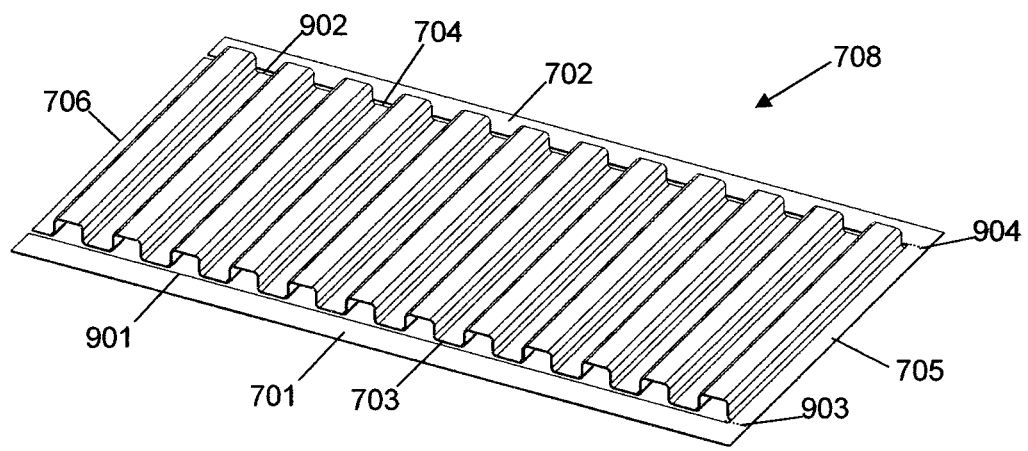
FIG. 9 is a perspective view of the corrugated separator plate of FIG. 8 after a corrugation process and prior to folding and bonding processes.
Figure 10:
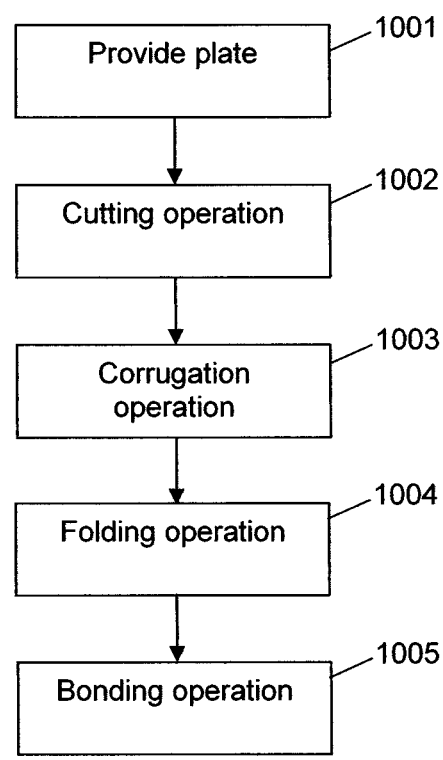
FIG. 10 is a flow chart illustrating an exemplary method according to an aspect of the invention.

The separator plate 708 is shown in isolation in FIGS. 8 and 9. FIG. 8 illustrates the finished form of the plate 708, while FIG. 9 shows the plate 708 in a partially formed state. The plate 708 comprises all the features of the corrugated separator plate 108 of the embodiments described above, but with the additional feature of first and second longitudinally extending strips 701, 702, which extend along respective first and second opposing edges 703, 704 of the plate 708. The strips 701, 702 are formed by cutting a planar feedstock plate along first and second cut lines 901, 902 (FIG. 9). The cut lines 901, 902 may be formed by a stamping operation for forming the basic shape of the plate 708. A schematic representation of a series of operations for forming the plate 708 is illustrated in FIG. 10, starting from a planar feedstock plate being provided (step 1001).

After the cutting operation (step 1002), the corrugated form of the central portion of the plate 708 is formed (step 1003), for example by passing the plate through a pair of gear toothed rollers. Alternatively, the plate 708 may be subjected to a further stamping operation to form the corrugations. In some embodiments, the cutting and stamping operations may be possible in a single step, although this may require the material from which the plate is formed to be able to withstand a degree of drawing and therefore thinning of the material between the crests of the corrugations.

After the cutting and corrugation processes, the strips 701, 702 are folded over (step 1004) so that the strips cover the crests of the corrugations along the first and second edges 703, 704 of the plate 708 and extend between the third and fourth opposing edges 705, 706 of the plate 708. First and second fold lines 903, 904 are indicated on the plate 708 in FIG. 9 extending between the first and second cut lines 901, 902 and the third edge 705 of the plate 708, the first and second fold lines 903, 904 being parallel with the first and second edges 703, 704 of the plate.

A final operation may be included (step 1005) to bond the free ends of the strips 701, 702 to the plate 708 at points towards the fourth edge 706 of the plate 708, forming bonded regions 711 (FIG. 8) that prevent lateral movement of the strips 701, 702 relative to the corrugated portion of the plate 708.

Other embodiments are intentionally within the scope of the invention as defined by the appended claims.

The invention claimed is:

1. A fuel cell assembly comprising:
   a membrane electrode assembly having a sub-gasket region;
   a cathode separator plate comprising a series of corrugations extending, and providing air flow paths, between first and second opposing edges of the cathode separator plate, each corrugation comprising a first crest on a first face of the cathode separator plate and a second crest on a second face of the cathode separator plate;
   the cathode separator plate further comprising a metal shim element disposed on the second face of the cathode separator plate in contact with at least a portion of the second crests of the series of corrugations,
   wherein the metal shim element is provided as an integral part of the separator plate, the metal shim comprising first and second strips longitudinally extending transverse the corrugations of the cathode separator plate and extending along respective first and second opposing edges of the plate, the first and second strips each attached to the series of corrugations by a fold from a portion of the second crest of a corrugation forming a third edge of the cathode separator plate;
   wherein the sub-gasket region of the membrane electrode assembly mates with the metal shim element to provide a fluid seal around a peripheral edge of the membrane electrode assembly;
   wherein the first and second strips of the metal shim do not extend beyond the ends of the air flow paths of the series of corrugations.

2. The fuel cell assembly of claim 1 wherein each of the first and second strips of the metal shim element is further attached to the series of corrugations by a bonded region disposed on a portion of the second crest of a corrugation forming a fourth edge of the cathode separator plate, the fourth edge being opposite the third edge.

3. The fuel cell assembly of claim 1 or claim 2 wherein the metal shim element has a larger thickness than at least a portion of the series of corrugations.

4. The fuel cell assembly of claim 2 wherein the bonded region is formed from spot welding or adhesive bonding between the metal shim element and the portion of the second crest forming a fourth edge of the cathode separator plate.

* * * * *